United States Patent
Boctor et al.

(10) Patent No.: US 10,025,793 B2
(45) Date of Patent: Jul. 17, 2018

(54) USING DISTRIBUTED SOURCE CONTROL IN A CENTRALIZED SOURCE CONTROL ENVIRONMENT

(71) Applicant: Microsoft Technology Licensing, LLC, Redmond, WA (US)

(72) Inventors: Victor Boctor, Redmond, WA (US); Theodore Albert Bucher, Snoqualmie, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 111 days.

(21) Appl. No.: 14/737,122

(22) Filed: Jun. 11, 2015

(65) Prior Publication Data

US 2016/0004719 A1    Jan. 7, 2016

Related U.S. Application Data

(63) Continuation of application No. 13/328,272, filed on Dec. 16, 2011, now abandoned.

(51) Int. Cl.
  *G06F 17/30*    (2006.01)
  *G06F 8/71*    (2018.01)

(52) U.S. Cl.
  CPC .......... *G06F 17/30174* (2013.01); *G06F 8/71* (2013.01); *G06F 17/30076* (2013.01);
  (Continued)

(58) Field of Classification Search
  CPC ........ G06F 17/30174; G06F 8/20; G06F 8/30; G06Q 10/06
  (Continued)

(56) References Cited

U.S. PATENT DOCUMENTS 5,586,310 A    12/1996 Sharman
5,675,802 A    10/1997 Allen et al.
(Continued)

FOREIGN PATENT DOCUMENTS

CN    101572724 A    11/2009
CN    101661388 A    3/2010
(Continued)

OTHER PUBLICATIONS

EP Communication dated Jul. 2, 2015 in Appln No. PCT/US2012/069970, 12 pgs.
(Continued)

*Primary Examiner* — Robert Beausoliel, Jr.
*Assistant Examiner* — Nirav K Khakhar (57) ABSTRACT

A method is presented for using a distributed source control system with a centralized source control system. A first set of files is obtained from a source control repository and stored on a first electronic computing device. The first set of files comprises all or part of a code base in the centralized source control system. A request is received for at least part of the code base from a second electronic computing device in a distributed source control system. As a result of the request, at least a part of the first set of files is sent to the second electronic computing device. A change set for the first set of files is received from the second electronic computing device. The change set is processed to be in a format compatible with the source control repository. The change set is submitted to the source control repository.

20 Claims, 4 Drawing Sheets

(52) U.S. Cl.
CPC .. *G06F 17/30117* (2013.01); *G06F 17/30215* (2013.01); *G06F 17/30578* (2013.01)

(58) Field of Classification Search
USPC .................................................. 707/625, 827
See application file for complete search history.

(56) References Cited

U.S. PATENT DOCUMENTS

| | | | |
|---|---|---|---|
| 5,721,914 | A | 2/1998 | Devries |
| 6,681,382 | B1 | 1/2004 | Kakumani et al. |
| 7,331,034 | B2 | 2/2008 | Anderson |
| 7,779,387 | B2 | 8/2010 | Harry et al. |
| 7,805,420 | B2 | 9/2010 | Kapoor et al. |
| 7,831,556 | B2 | 11/2010 | Behl et al. |
| 2001/0037398 | A1 | 11/2001 | Chao et al. |
| 2002/0078205 | A1 | 6/2002 | Nolan |
| 2002/0095399 | A1 | 7/2002 | Devine et al. |
| 2010/0131940 | A1 | 5/2010 | Jazdzewski |
| 2013/0159365 | A1 | 6/2013 | Boctor et al. |

FOREIGN PATENT DOCUMENTS

| | | |
|---|---|---|
| CN | 101753609 A | 6/2010 |
| KR | 10-1041092 B1 | 6/2011 |

OTHER PUBLICATIONS

Van der Hoek et al., "A Generic, Peer-to-Peer Repository for Distributed Configuration Management"; Software Engineering Research Laboratory, 1996 IEEE: Proceedings of ICSE-18; Mar. 25-30, 1996 Germany; 10 pgs, Allen et al., "ClearCase MultiSite: Supporting Geographically-Distributed Software Development"; Atria Software, Inc.; ICSE SCM Workshop: Jan. 1, 1995; 22 pgs.

"Second Office Action Issued in Chinese Patent Application No. 201210544598.1", dated Oct. 20, 2015, 7 Pages.

Fritchey, Grant; "Change Management and Source Control" copyright 2005-2011Red Gate Software, 14 pages.

Introduction to Distributed Source Control accessed at: http://www.ytechie.com/2009/11/introduction-to-distributed-source-control.html; posted Nov. 6, 2009, 12 pages.

Manegay, Christopher; "Using Source Code Control in Team Foundation" published Sep. 2005, 12 pages.

Version Control Best Practices for Enterprise Architect—copyright 2010 Sparx Systems, 17 pages.

Han, K. et al., "A study on the distribution of overload in academic affairs management system using replication server," International Journal of Information Processing Systems, vol. 8-D, No. 5, pp. 605-612, 2001.

International Search Report and Written Opinion dated Apr. 23, 2013 in PCT/US2012/069970, 8 pages.

"First Office Action and Search Report issued in Chinese Patent Application No. 201210544598.1", dated Feb. 28, 2015, 15 Pages.

"Git and Subversion", Published on: Jun. 14, 2007, Available at: http://lifegoo.pluskid.org/?p=24; 4 pgs.

Chinese Notice of Allowance in Application 201210544598., dated Mar. 8, 2016, 5 pgs.

PCT International Preliminary Report on Patentability in Application PCT/US2012/069970, dated Jun. 17, 2014, 5 pgs.

U.S. Appl. No. 13/328,272, Office Action dated Sep. 28, 2012, 22 pages.

U.S. Appl. No. 13/328,272, Amendment and Response filed Jan. 28, 2013, 12 pages.

U.S. Appl. No. 13/328,272, Office Action dated Jun. 3, 2013, 25 pages.

U.S. Appl. No. 13/328,272, Amendment and Response filed Nov. 4, 2013, 13 pages.

U.S. Appl. No. 13/328,272, Notice of Allowance dated Mar. 11, 2015, 7 pages.

U.S. Appl. No. 13/328,272, Notice of Allowance dated May 8, 2015, 4 pages.

USING DISTRIBUTED SOURCE CONTROL IN A CENTRALIZED SOURCE CONTROL ENVIRONMENT

CROSS-REFERENCE TO RELATED APPLICATIONS

This application is a continuation of, and claims priority to U.S. patent application Ser. No. 13/328,272, filed Dec. 16, 2011, entitled "USING DISTRIBUTED SOURCE CONTROL IN A CENTRALIZED SOURCE CONTROL ENVIRONMENT," which application is incorporated herein by reference in its entirety.

BACKGROUND

Source control systems are used during software development for revision control of source code. Centralized source control systems permit revision control from a central location, typically based on a client/server model. In a centralized source control system, a server computer typically maintains a source code repository. A software developer on a client computer may check out source code from the source code repository and check the source code back in to the source code repository, for example after code changes are made.

Distributed source control systems provide for revision control based on a peer to peer model. In a distributed source control system, a working copy of the source code on each peer node, for example on each client computer, may constitute a source code repository. Distributed source control systems are commonly referred to as decentralized source control systems.

Software development companies typically either use a centralized source control system or a distributed source control system for a project, but not both. Companies typically have a large investment in their centralized source control systems and may find it difficult and expensive to change to a different type of source control system. Many developers like to use a distributed source control system but also may need to check their source code into a company's centralized source control system.

SUMMARY

Embodiments of the disclosure are directed to a method for using a distributed source control system with a centralized source control system. On a first electronic computing device, a first set of files is obtained from a source control repository. The first set of files comprises all or part of a code base in the centralized source control system. The source control repository is a source control repository in the centralized source control system. The first set of files is stored on the first electronic computing device. A request is received for at least part of the code base from a second electronic computing device. The second electronic computing device is an electronic computing device in a distributed source control system. As a result of the request, at least a part of the first set of files is sent to the second electronic computing device. A second set of files is received from the second electronic computing device. The second set of files is a change set for the first set of files. The change set is processed so that the change set is in a format compatible with the first source control repository. When the change set is in a format compatible with the first source control repository, the change set is submitted to the first source control repository.

This Summary is provided to introduce a selection of concepts, in a simplified form, that are further described below in the Detailed Description. This Summary is not intended to identify key or essential features of the claimed subject matter, nor is it intended to be used in any way to limit the scope of the claimed subject matter.

DETAILED DESCRIPTION

The present application is directed to systems and methods for using a distributed source control system in a centralized source control environment. Using the systems and methods, a replica of a source code repository is obtained from a centralized source control system and stored on a server computer. Typically, the replica of the source code repository corresponds to a software development project that a user is working on. The replica of the source code repository is used as a software repository for the distributed source control system. The replica of the source code repository is updated periodically, mirroring changes made to source code repository on the centralized source control system. In this disclosure, the replica of the source code repository is referred to as a team hub.

The distributed source control system typically comprises a plurality of client computers. When a software developer on one of the client computers needs to do work on the project, the software developer requests source code from the team hub. In some examples, the request may be for a complete code base of the software development project. In other examples, the request may be for only a portion of the code base for the software development project. When the request for the source code is made, a work area for the source code is created on the client computer. The source code obtained from the team hub is stored in the work area.

The software developer may edit one or more source code files stored in the work area. When the software developer has completed editing the one or more source code files, the one or more source code files are packaged into a format that is compatible with the centralized source control system. The packaged files, comprising edits to the source code files made on the distributed source control system, are then submitted to the centralized source control system to be checked in. In this manner, one or more files may be obtained from the centralized source control system, edited on the distributed source control system and then checked into the centralized source control system.

Figure 1:
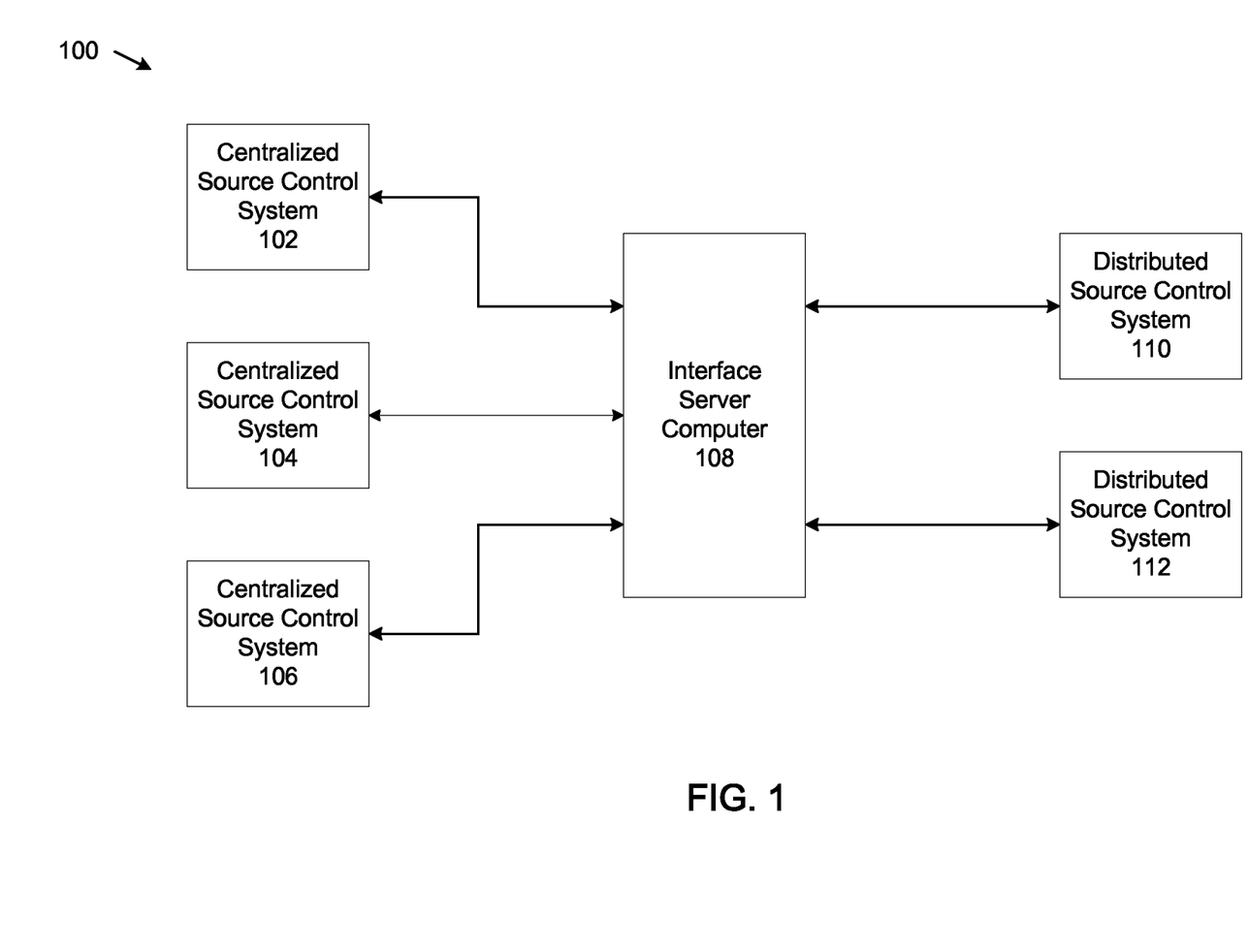
FIG. 1 shows an example system that supports the use of a distributed source control system in a centralized source control environment.

FIG. 1 shows an example system 100 that supports the use of a distributed source control system in a centralized source control environment. The example system 100 includes centralized source control systems 102, 104, 106, interface server computer 108 and distributed source control systems 110 and 112. The example centralized source control systems 102, 104, 106 are revision and version control systems for managing changes to computer documents and files. A repository of the computer documents and files are typically stored in a centralized location, typically on one or more server computers. The centralized source control systems 102, 104, 106 support a client/server model.

Software developers, typically using a client computer check files out from the centralized location, make changes to the checked out files and then check the files back in to the centralized location. One example of a centralized source control system is the Team Foundation Server source control system from Microsoft Corporation of Redmond, Wash. A second example is the Perforce source control system from Perforce Software. Other examples of centralized source control systems are possible. More or fewer centralized source control systems may be included in the example system 100.

The example interface server computer 108 provides bridging technology that permits the centralized source control systems 102, 104, 106 to operate with the distributed source control systems 110, 112. The interface server computer 108 obtains replicas of source code repositories stored on the centralized source control systems 102, 104 and 106. The replicas typically include all branches in each source code repository and a full history of changes made to the source code repository.

The replicas, also known in this disclosure as the team hub, are stored on the interface server computer 108. The interface server computer 108 also processes files edited on the distributed source control system 110, 112 into a format compatible for checking the edited files into the centralized source control systems 102, 104, 106. In examples, the team hub and check-in functionality of the interface server computer 108 may be incorporated in one or more of the centralized source control systems 102, 104, 106. In addition, in examples a plurality of team hubs may be used. For example, there may be a separate team hub for each project with each team hub providing a replica of the source code repository for a different project.

Typically, one or more files edited on one of distributed source control system 110, 112 are packaged to be checked into one of the centralized source control systems 102, 104, 106. The interface server computer 108 directs changes of checked out files from the distributed source control system on which the changes are made to the centralized source control system in which the changes are checked in. In examples, the interface server computer 108 may be configured to direct changes from one distributed source control system to a specific centralized source control system.

In other examples, the interface server computer 108 may maintain an internal table of which distributed source control system corresponds to which centralized source control system. For example, if a request from a client computer in one distributed source control system is made for files for a project included in a team hub associated with a specific centralized source control system, the interface server computer 108 may maintain a table associating the distributed source control system with the centralized source control system.

The example distributed source control systems 110, 112 implement a peer-to-peer model of source control. In the distributed source control systems 110, 112, each peer mode, typically a client computer, stores a working copy of a source code repository. One or more code branches may be created from the working copy. Software developers may make changes to software files online or offline. Software developers on different client computers may share edited files directly, obviating the need to transfer files to a centralized location. Two examples of a distributed source control system are the Mercurial distributed source control system and the Git distributed source control system. Other examples of distributed source control systems are possible. More or fewer distributed source control systems may be included in the example system 100.

The example system 100 also supports a hybrid model wherein software development teams can use tools associated with a centralized source control system and also use tools associated with a distributed source control system. For example, a software developer can use a client computer to check files in and out of a source code repository on a centralized source control system, for example on centralized source control system 102, using tools for check-in and check-out associated with centralized source control system 102.

The same software developer can also use the client computer as part of a distributed source control system, for example distributed source control system 110, to work offline, share files with other client computers in the distributed source control system and use tools associated with the distributed source control system. The software developer may also create code branches on the distributed software control system. The code branches typically are associated with new software features being developed or bug fixes being made. The code branches may be shared with other developers. Multiple check-ins can be done on the code branches. The software developer may use standard tools for pre check-in validation that were created around the centralized source control system to work with changes developed in their distributed source control system work area. This is done by packaging data in a common format and either submitting a change set directly to the centralized source control system or submitting the change set to the interface server computer 108, from where the change set is submitted to the centralized source control system, as explained in more detail later herein.

Figure 2:
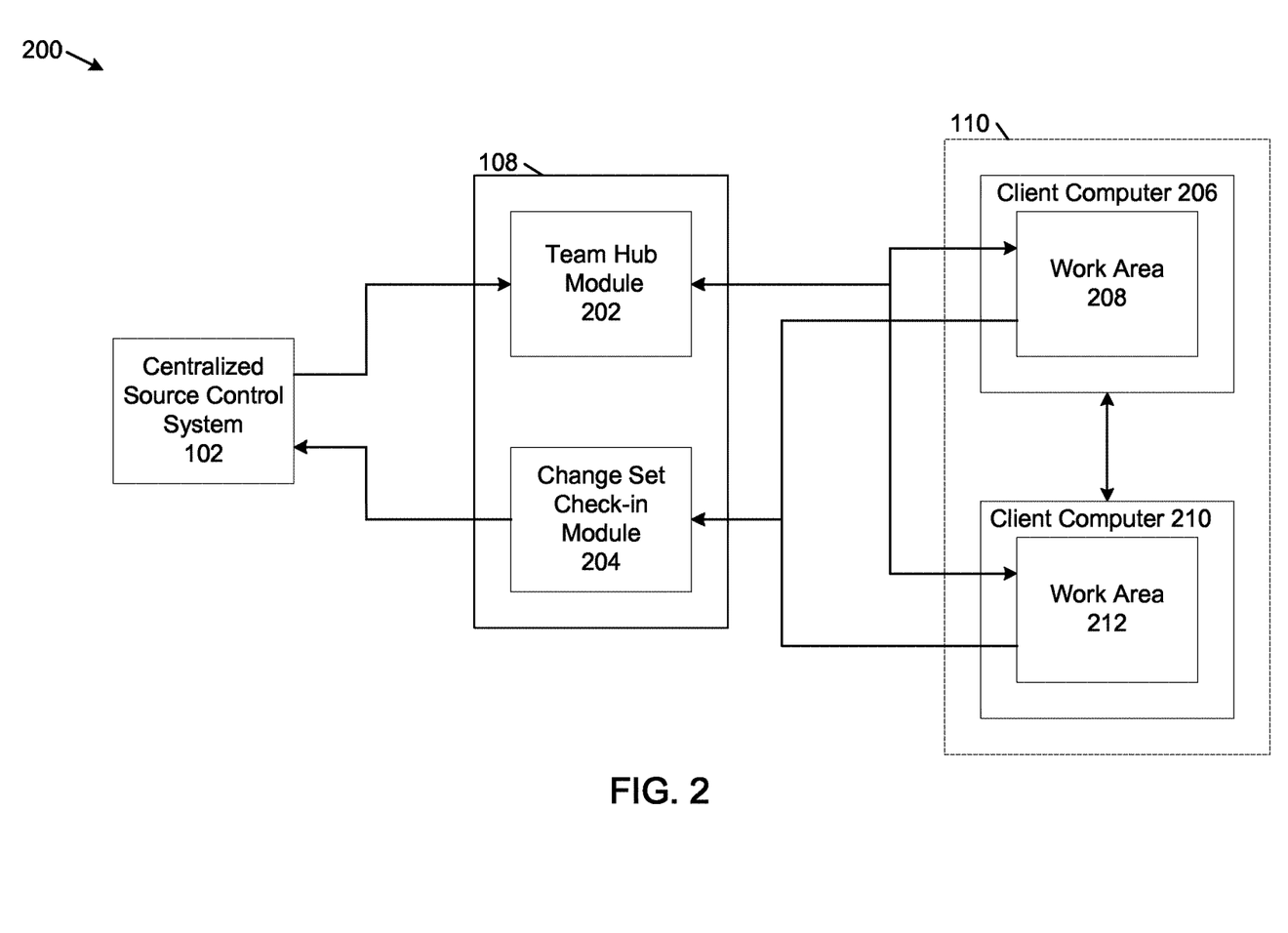
FIG. 2 shows example components of the interface server computer and the distributed source control system of FIG. 1.

FIG. 2 shows an example system 200 that describes the operation of interface server computer 108 and distributed source control system 110 in more detail. The example system 200 includes the centralized source control system 102, the interface server computer 108 and the distributed source control system 110. The interface server computer 108 includes an example team hub module 202 and an example change set check-in module 204. The distributed source control system 110 includes client computers 206 and 210. Client computer 206 includes work area 208 and client computer 210 includes work area 212. More or fewer client computers may be included in the distributed source control system 110.

In examples, the team hub module 202 obtains and stores a replica of a source code repository for a project from the centralized source control system 102. The replica of the source code repository includes copies of all the files, all the code branches and all the history records for the project from the source code repository. In addition, the team hub module obtains periodic updates of the source code repository from the centralized source control system 102. In examples, the periodic updates may occur at time intervals of 5 to 15 minutes. Other time intervals are possible. In examples, the obtaining of the periodic updates, also known as mirroring, may be triggered using commit notifications from the centralized source control system 102.

When a software developer on client computer 206 has a need to access source code for the project, client computer 206 sends a request for the source code to the team hub module 202. The request may be for the entire code base for the project or the request may be for a portion of the code base for the project. The source code obtained is sometimes referred to as a software enlistment or work area. When the requested source code is obtained from team hub module 202, the source code is stored in a work area 208 on client computer 206.

The software developer on client computer 206 may edit one or more files stored in work area 208. In addition, the software developer may create one or more new code branches of the source code stored in work area 208, edit one or more source code files in the one or more code branches and check the edited code back into work area 208.

In a similar manner, when a software developer on client computer 210 has a need to access source code for the project, client computer 210 sends a request for the source code to the team hub module 202. The request may be for the entire code base for the project or the request may be for a portion of the code base for the project. When the requested source code is obtained from team hub module 202, the source code is stored in a work area 212 on client computer 206.

The software developer on client computer 210 may edit one or more files stored in work area 212. In addition, the software developer may create one or more code branches of the source code stored in work area 212, edit one or more source code files in the one or more code branches and check the edited code back into work area 212.

The software developers on client computers 206 and 210 may also work together on a specific software feature. Typically, this is done by creating a separate branch of the source code for the feature. For example, one software developer, for example the software developer on client computer 206, may write code for the feature and another software developer, for example the software developer on client computer 210 may test the code for the feature.

At some point, the software developers on client computers 206 and 210 may want to check updated source files into centralized source control system 102. Typically, on a distributed source control system, the updated source files and other changes are packaged into a change set and submitted to a centralized source control system for check-in. However, the distributed source control system 110 may use different commands for check-in and a different file format for check-in than is used in centralized source control system 102. Therefore, the change set needs to be processed into a format that is compatible with centralized source control system 102.

The change set typically includes all source files that have been added, deleted or modified, typically for work done in a code branch, for example for bug fixes or for a specific feature. The change set also includes a manifest or description of the changes that were made. For example, if a user added file A, edited file A, edited file B, added file C and deleted file C over five separate distributed source control system check-ins, the change set includes file A, file B and the manifest. In addition, the change set typically includes versioning information, timestamps, authors, etc. In some examples, the change set is packaged into one file, for example a zip file that includes all the changed source code files and the manifest. In other examples, the changed files are provided individually. In some examples the change set comprises an XML file or a script. The change set check-in module 204 processes the change set into a format compatible with centralized source control system 102. Because the source code changes are in a format compatible with centralized source control system 102, the source code changes may be now be checked into the centralized source control system 102. As a result, changes made on client computers 206 and 210 in a distributed source control system may be checked-in on centralized source control system 102.

The change set check-in module 204 also handles situations where multiple centralized source control systems and multiple distributed source code control systems are used, for example system 100 in FIG. 1. For example, each distributed source control system 110, 112 may have source code changes that are directed to any one of centralized source control systems 102, 104, 106.

In examples, source code updates received from distributed source control systems 110, 112 include an indication of which centralized source control system the source code updates are directed to. For example, when distributed source code enlistments are created, the distributed source code enlistments typically include a team hub client configuration file that points the distributed source code enlistments to the appropriate target centralized source code control system. Team hub client tools may then be used to package the source code changes and to direct the packaged source code changes to the appropriate target centralized source code control system. In other examples, the change set check-in module 204 includes routing information that associates a distributed source control system with a centralized source control system. When source code updates are received from a distributed source control system, the change set check-in module 204 formats the source code updates to be compatible with the appropriate centralized source control system.

The centralized source control system 102 may receive source code changes on one or more feature code branches from a plurality of client computers, for example from client computers 206 and 210 in distributed source control system 110 and from one or more client computers in distributed source control system 112. Once source code changes on a code branch are submitted to centralized source control system 102, the changes are eventually mirrored to team hub module 202. When mirrored to team hub module 202, the code branch may be deleted in the distributed source control system 112 because the code branch is now redundant.

Sometimes, when source code updates are submitted to a centralized source control system conflicts occur. The conflicts are typically the result of one or more software developers making changes to the source code repository on the centralized source control system after another software developer has obtained files from the source code repository. For example, if a software developer on client computer 206 is working in a feature code branch from a code base obtained from team hub module 202 and another software developer on client computer 210 made changes to this same code base and checked those changes back into the source code repository in centralized source control system 102 before the software developer on client computer 206 checked similar files into centralized source control system 102, one or more files now stored in the centralized source control system 102 may now be different than the files being submitted by the software developer on client computer 206. In situations like this, the centralized source control system 102 may reject source code changes submitted by the software developer on client computer 206. The software developer on client computer 206 may need to manually resolve the conflicts before re-submitting the source code changes to centralized source control system 102. The software developer on client computer 206 manually resolves the conflicts by obtaining the most recent source code from team hub module 202, merging the source code changes in the feature branch with the most recent obtained source code and re-submitting the source code changes.

Figure 3:
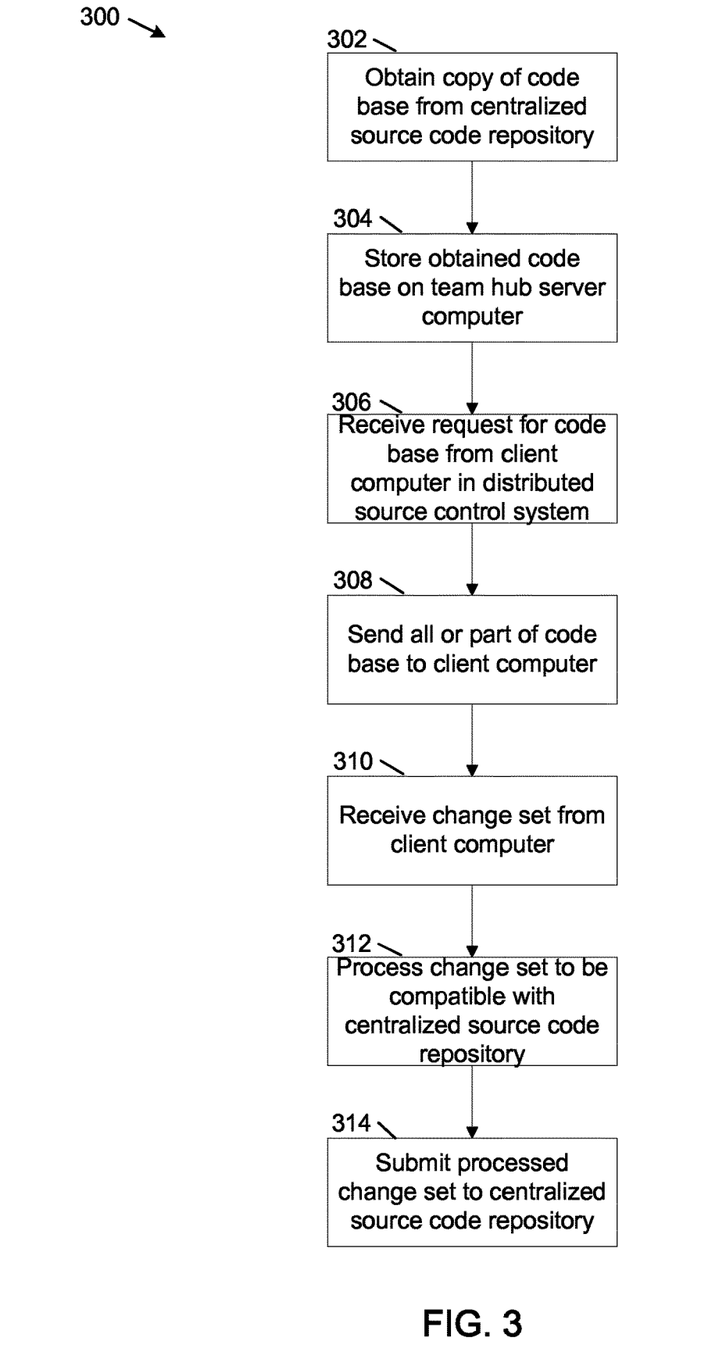
FIG. 3 shows an example flowchart of a method for using a distributed source control system with a centralized source control system.

FIG. 3 shows an example flowchart of a method 300 for using a distributed source control system with a centralized source control system. At operation 302, a first set of files is obtained from a centralized source control repository. The centralized source control repository is part of a centralized source control system, such as the Team Foundation Server source control system from Microsoft Corporation. The first set of files typically comprises a code base for a project.

The code base is typically obtained from the centralized source code repository based on a request from a server computer in the centralized source control system, for example from interface server computer 108 (team hub server computer). In some examples, the team hub server computer is different from a server computer that hosts the centralized source code repository. In other examples, the team hub server computer is the same server computer that hosts the centralized source code repository. In other examples, the team hub server computer is a developer's computer.

At operation 304, the obtained code base is stored on the team hub server computer. The team hub server computer acts as a source code hub for client computers in a distributed source control system. One or more client computers may request all or part of the code base. An example of a source code hub is team hub module 202 on interface server computer 108.

At operation 306, a request is received for the code base from a client computer, for example from client computer 206, on a distributed source control system. The request may be for the complete code base stored on the team hub server computer. Alternatively, the request may be for a portion of the code base stored on the team hub server computer.

In some examples, the request comprises checking out the portion of the code base from the team hub server computer. In examples, more than one client computer, for example client computer 210 may check out all or part of the code base. Checking out files refers to the team hub server computer making a copy of the requested files and sending the requested files to the client computer making the request for the files.

At operation 308, the requested files are sent to client computer. The files are received at client computer 206 and stored in a work area, for example in work area 208 on client computer 206. The work area is a memory area on client computer 206 in which the files may be edited and from which one or more code branches may be created or deleted. In examples, a code branch corresponds to a specific feature or a bug fix in the project. For example a code branch may represent the code base at a certain date in time or the code base may represent a version of the code base dedicated to a specific operation, such as testing. Code branches typically correspond to different releases. In addition, a source code file may be modified multiple times on different code branches. For example, file X may have been modified N times on branch Y and M times on branch Z. Other examples of code branches are possible. The modified files for the code branches may be checked into centralized source control system 102, as discussed herein.

At operation 310, a change set is received from client computer 206. The change set includes files that were added, deleted or modified on client computer 206. The change set also includes a manifest that provides a description of changes made to the source code on client computer 206. The manifest is needed to replicate the changes from the distributed source control system to the centralized source control system with the highest fidelity. For example, file A may be renamed to file B, file C may be copied to file D and then modified, file E may be deleted, etc.

The change set also includes author names, version numbers, timestamps, etc. Other information may be included in the change set. The change set may comprise one file, for example a zip file, or the change set may comprise a plurality of files. In examples, the change set may comprise and XML file or a script. Other examples of change sets are possible.

In addition to including changes made on client computer 206, the change set may include changes to source files made by one or more other client computers, for example client computer 210. In a distributed source control system, individual client computers in the distributed source control system may communicate code changes with each other. In addition, developers may be working directly with a centralized source control system, for example centralized source control system 102, in parallel with other developers that may be working directly with the distributed source control system.

At operation 312, the change set is processed in the change set check-in module 204 to be compatible for check-in at the centralized source control system. The centralized source control system 102 typically uses a different syntax and procedures for checking files in and out than used in the distributed source control system 110. When the change set is processed in the change set check-in module 204, one or more files in the second set of files may be formatted into a format compatible with the centralized source control system 102. At operation 314, the change set is submitted for check-in to the centralized source control system 102.

When the change set is packaged at client computer 106, the tool that packages the change set also includes an indication of the type of distributed source control system being used, for example the Mercurial distributed source control system or the Git distributed source control system. When the change set is processed at operation 312, the change set check-in module 204 makes a determination from the change set as to which distributed source control system is being used. The change set is packaged in a format independent of the distributed source control system being used.

The change set check-in module 204 also makes a determination as to which centralized source control system the change set is to be directed to. As a result of the determination of the distributed source control system from which the change set originated and the centralized source control system to which the change set is to be checked into, the check-in module 204 may need to modify or reformat one or more files in the change set so that the change set is compatible with centralized source control system to which the change set is to be checked into. However, at the time of check-in, the centralized source control system does not need to know on which distributed source control system the change set was created and at the time the distributed source control system creates and packages the change set, the distributed source control system does not need to know which centralized source control system the change set is directed to. As a result, for code check-in each distributed source control system only needs to direct change sets to the change set check-in module 204 and does not need a link to every centralized source control system. Similarly, for code check-in each centralized source control system only needs to have a link to the check-in module 204 and does not need a link to every distributed source control system.

In example systems where only one centralized source control system is used, for example centralized source control system 102, client computer 206 may send the packaged change set directly to centralized source control system 102. In examples, the packaged change set may be sent directly to centralized source control system 102, even for the case where multiple centralized source control systems are used. For example, changes on a branch may be submitted directly to centralized source control system 102 or to a specified centralized source control system.

Figure 4:
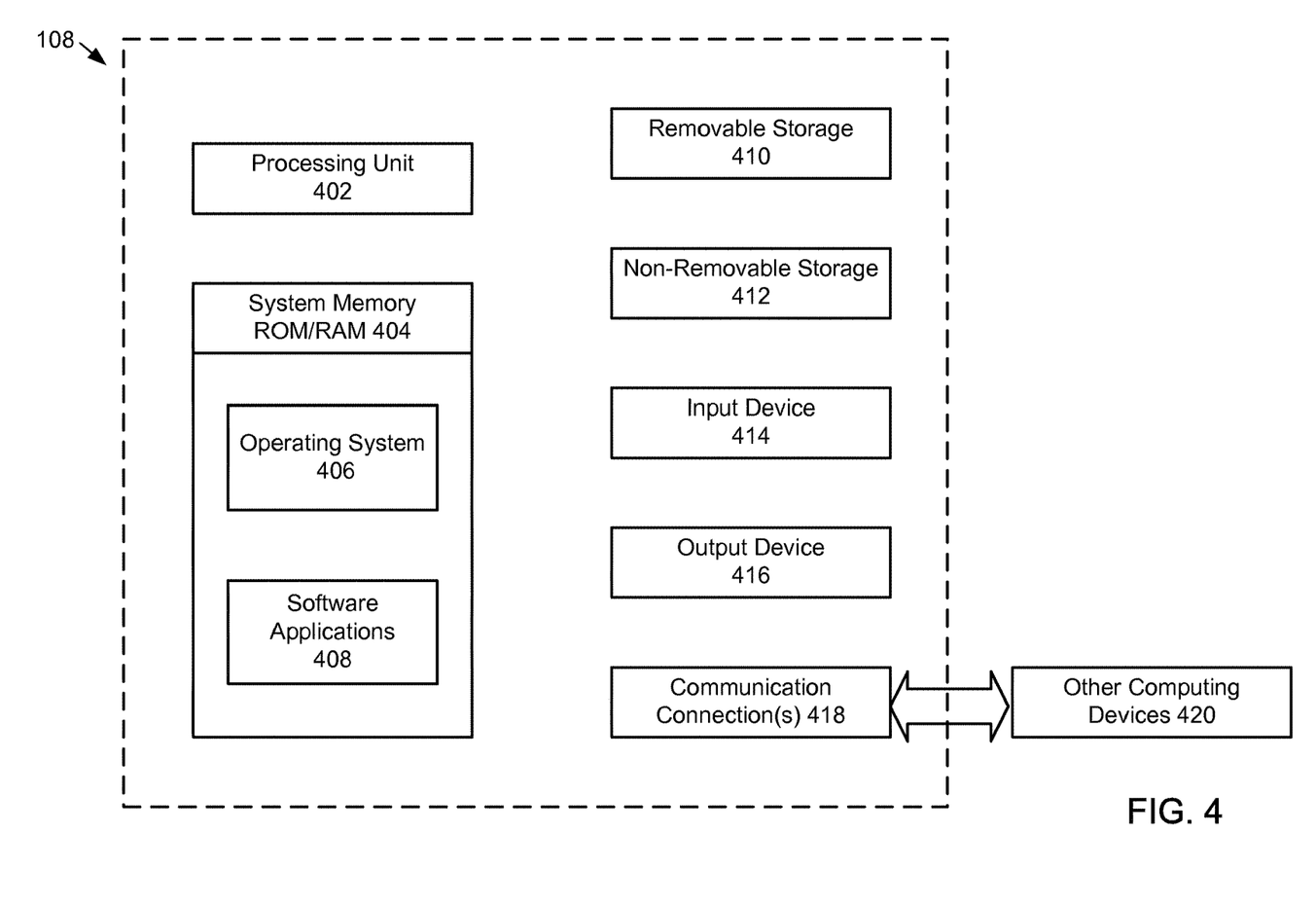
FIG. 4 shows example components of the interface server computer of FIG. 1.

With reference to FIG. 4, example components of interface server computer 108 are shown. In example embodiments, server computer 108 is a computing device. Server computer 108 can include input/output devices, a central processing unit ("CPU"), a data storage device, and a network device. Server computer 108 can also be a mobile computing device, such as a laptop, tablet, convertible, or other handheld device like a smartphone or cellular telephone.

In a basic configuration, server computer 108 typically includes at least one processing unit 402 and system memory 404. Depending on the exact configuration and type of computing device, the system memory 404 may be volatile (such as RAM), non-volatile (such as ROM, flash memory, etc.) or some combination of the two. System memory 404 typically includes an operating system 406 suitable for controlling the operation of a client computer. The system memory 404 may also include one or more software applications 408 and may include program data.

The server computer 108 may have additional features or functionality. For example, server computer 108 may also include computer readable media. Computer readable media can include both computer readable storage media and communication media.

Computer readable storage media is physical media, such as data storage devices (removable and/or non-removable) including magnetic disks, optical disks, or tape. Such additional storage is illustrated in FIG. 4 by removable storage 410 and non-removable storage 412. Computer readable storage media may include volatile and nonvolatile, removable and non-removable media implemented in any method or technology for storage of information, such as computer readable instructions, data structures, program modules, or other data. Computer readable storage media can include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by server computer 108. Any such computer readable storage media may be part of server computer 108. Server computer 108 may also have input device(s) 414 such as keyboard, mouse, pen, voice input device, touch input device, etc. Output device(s) 416 such as a display, speakers, printer, etc. may also be included.

Consistent with embodiments of the present disclosure, the input device(s) 414 may comprise any motion detection device capable of detecting the movement or gesture of a user. For example, the input device(s) 414 may comprise a Kinect® motion capture device, from Microsoft Corporation, comprising a plurality of cameras and a plurality of microphones.

The server computer 108 may also contain communication connections 418 that allow the device to communicate with other computing devices 420, such as over a network in a distributed computing environment, for example, an intranet or the Internet. Communication connections 418 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Embodiments of the present disclosure may be practiced via a system-on-a-chip (SOC) where each or many of the components illustrated in FIG. 4 may be integrated onto a single integrated circuit. Such an SOC device may include one or more processing units, graphics units, communication units, system virtualization units and various application functionality all of which are integrated (or "burned") onto the chip substrate as a single integrated circuit. When operating via an SOC, the functionality, described above, with respect to the present disclosure may be operated via application-specific logic integrated with other components of the server computer 108 on the single integrated circuit (chip).

The various embodiments described above are provided by way of illustration only and should not be construed to limiting. Various modifications and changes that may be made to the embodiments described above without departing from the true spirit and scope of the disclosure.

What is claimed is:

1. A computer implemented method, the computer implemented method comprising:
   receiving a first request from a first distributed electronic computing device for a first set of one or more files from a first source control repository, the first set of files comprising all or part of a code base in the centralized source control system;
   sending the first set of files to the first distributed electronic computing device;
   receiving a second request from a second distributed electronic computing device;
   as a result of the second request, sending at least part of the first set of files to the second distributed electronic computing device;
   determining to send a change set to the first source control repository based on changes received from at least one of the first or second distributed electronic computing devices, wherein the determination is made by using a link between a check-in module and a first source control repository, without requiring the link to reference either of the first distributed electronic computing device or the second distributed electronic computing device; and
   processing the change set so that the change set is in a format compatible with the first source control repository.

2. The method of claim 1, further comprising periodically obtaining updates from a first source control repository for one or more files of the first set of files and storing the updates.

3. The method of claim 1, wherein the change set identifies a centralized source control system to which the change set is to be submitted.

4. The method of claim 1, wherein the change set includes a manifest that summarizes changes included in the change set.

5. The method of claim 1, wherein the change set includes additions and deletions to the first set of files.

6. The method of claim 1, wherein the change set includes versioning information.

7. The method of claim 1, wherein the change set includes source code changes from one or more source code branches not included in the first set of files.

8. The method of claim 7, wherein at least one of the source code branches is a feature branch, the feature branch comprising one or more software features or one or more software bug fixes.

9. The method of claim 1, wherein the change set includes a zip file.

10. The method of claim 1, wherein the change set includes an XML file.

11. The method of claim 1, wherein the change set includes a script.

12. The method of claim 1, wherein the first source control repository resides on the first distributed electronic computing device.

13. The method of claim 1, further comprising:
sending the first set of files to a third distributed electronic computing device, the third distributed electronic computing device being part of a second distributed source control system;
receiving a third set of one or more files from the third distributed electronic computing device, the third set of one or more files being a second change set for the first set of files;
processing the second change set so that the second change set is in a format compatible with the first source control repository; and
when the second change set is in a format compatible with the first source control repository, submitting the second change set to the first source control repository.

14. An interface computing device comprising:
a processing unit; and
system memory, the system memory including instructions that, when executed by the processing unit, cause the interface computing device to:
obtain a first set of one or more files from a first source control repository, the first source control repository being a source control repository in a centralized source control system;
store the first set of files on the interface computing device;
receive a request for the first set of files from a distributed electronic computing device, the distributed electronic computing device being an electronic computing device in a first distributed source control system;
as a result of the request, send the first set of files to the distributed electronic computing device;
receive a second set of one or more files from the distributed electronic computing device, the second set of one or more files being a change set for the first set of files;
determine to send the change set to the first source control repository, wherein the determination is made by using a link between the first source control repository and the interface computing device, without requiring the link to reference the distributed electronic computing device;
process the change set so that the change set is in a format compatible with the first source control repository; and
when the change set is in a format compatible with the first source control repository, submit the change set to the first source control repository.

15. The interface computing device of claim 14, wherein the interface computing device supports a hybrid model, the hybrid model permitting source code check-out and check-in from a first client computer that is part of the centralized source control system and from a second client computer that is part of the first distributed source control system.

16. The interface computing device of claim 14, further comprising periodically obtaining updates from the first source control repository for one or more files of the first set of files and storing the updates on the interface computing device.

17. The interface computing device of claim 14, wherein the change set identifies a centralized source control system to which the change set is to be submitted.

18. The interface computing device of claim 14, wherein the first source control repository resides on the interface computing device.

19. The interface computing device of claim 14, further comprising:
sending the at least part of the first set of files to a second distributed electronic computing device, the second distributed electronic computing device being part of a second distributed source control system;
receiving a third set of one or more files from the second distributed electronic computing device, the third set of one or more files being a second change set for the first set of files;
processing the second change set so that the change set is in a format compatible with the first source control repository; and
when the second change set is in a format compatible with the first source control repository, submitting the second change set to the first source control repository.

20. A computer readable storage device not consisting of a propagated signal, comprising instructions that, when executed by an interface computing device, cause the interface computing device to:
obtain a first set of one or more files from a first source control repository, the first source control repository being a source control repository in a centralized source control system;
store the first set of files on the interface computing device;
periodically obtain updates from the first source control repository for one or more files of the first set of files and store the updates on the interface computing device;
receive a request for the first set of files from a first distributed electronic computing device, the first distributed electronic computing device being an electronic computing device in a first distributed source control system;
as a result of the request, send the first set of files to the first distributed electronic computing device;
receive a second set of one or more files from the first distributed electronic computing device, the second set of one or more files being a first change set for the first set of files, the first change set including a manifest that summarizes changes included in the first change set, the first change set including additions and deletions to the first set of files, the first change set including versioning information, the first change set including one or more source code branches not included in the first set of files, at least one of the source code branches being a feature branch, the feature branch comprising one or more software features or one or more software bug fixes;

determine to send the change set to the first source control repository, wherein the determination is made by using a link between the first source control repository and the interface computing device, without requiring the link to reference the first distributed electronic computing device;

process the first change set so that the first change set is in a format compatible with the first source control repository;

when the first change set is in a format compatible with the first source control repository, submit the first change set to the first source control repository;

send the first set of files to a second distributed electronic computing device, the second distributed electronic computing device being part of a second distributed source control system;

receive a third set of one or more files from the second distributed electronic computing device, the third set of one or more files being a second change set for the first set of files, the second change set including additions and deletions to the first set of files, the second change set including versioning information, the second change set including one or more source code branches not included in the first set of files, at least one of the source code branches being a feature branch, the feature branch comprising one or more software features or one or more software bug fixes;

process the second change set so that the second change set is in a format compatible with the first source control repository; and when the second change set is in a format compatible with the first source control repository, submitting the second change set to the first source control repository.

* * * * *